United States Patent
Park et al.

(10) Patent No.: US 9,889,889 B2
(45) Date of Patent: Feb. 13, 2018

(54) STRUCTURE FOR REINFORCING SHOCK ABSORBER HOUSING

(71) Applicant: HYUNDAI MOTOR COMPANY, Seoul (KR)

(72) Inventors: Junyoung Park, Hwaseong-si (KR); Minsoo Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/836,656

(22) Filed: Aug. 26, 2015

(65) Prior Publication Data

US 2016/0107593 A1 Apr. 21, 2016

(30) Foreign Application Priority Data

Oct. 17, 2014 (KR) ........................ 10-2014-0141170

(51) Int. Cl.
*B60R 19/24* (2006.01)
*B62D 25/08* (2006.01)

(52) U.S. Cl.
CPC ............ *B62D 25/088* (2013.01); *B60R 19/24* (2013.01)

(58) Field of Classification Search
CPC ............................ B60R 25/088; B62D 25/088
See application file for complete search history.

(56) References Cited

U.S. PATENT DOCUMENTS

| | | | |
|---|---|---|---|
| 2009/0230665 A1* | 9/2009 | Tamura | B62D 25/088 280/785 |
| 2012/0138757 A1* | 6/2012 | Hong | B62D 25/088 248/205.1 |

FOREIGN PATENT DOCUMENTS

| | | | | |
|---|---|---|---|---|
| DE | 102013209099 A1 * | 11/2014 | | B62D 25/088 |
| JP | 2010-247599 A | 11/2010 | | |
| JP | 2014-113979 A | 6/2014 | | |
| KR | 10-2001-0003108 A | 1/2001 | | |
| KR | 10-2011-0020979 A | 3/2011 | | |
| KR | 10-1371480 B1 | 3/2014 | | |

\* cited by examiner

*Primary Examiner* — D Glenn Dayoan
*Assistant Examiner* — Melissa A Black
(74) *Attorney, Agent, or Firm* — McDermott Will & Emery LLP

(57) ABSTRACT

A structure for reinforcing a shock absorber housing includes a shock absorber housing connecting a shock absorber mounting panel and a front side member. A front fender apron inner panel connects the shock absorber mounting panel and the front side member. The front fender apron inner panel is coupled to an outer surface of the shock absorber housing and overlapped with a portion of the shock absorber housing to form a wheel house with the shock absorber housing. An extension panel is connected from a side of the overlapped portion of the shock absorber housing and the front fender apron inner panel to a sub-frame mounting portion of the front side member.

7 Claims, 4 Drawing Sheets

-- Related Art --

STRUCTURE FOR REINFORCING SHOCK ABSORBER HOUSING

CROSS-REFERENCE TO RELATED APPLICATION

This application claims the benefit of priority to Korean Patent Application No. 10-2014-0141170 filed in the Korean Intellectual Property Office on Oct. 17, 2014, the entire content of which is incorporated herein by reference.

TECHNICAL FIELD

The present disclosure relates to a structure for reinforcing a shock absorber housing, and more particularly, to a structure for reinforcing a shock absorber housing that enables a sturdy vehicle body structure and improves transmission and dispersion load, and vibration absorbing performance.

BACKGROUND

Generally, a vehicle includes a shock absorber as a buffering apparatus for realizing smooth and reliable driving performance by attenuating spring resilience to absorb the impact from a road surface.

In the shock absorber, a lower portion thereof is respectively connected to knuckles of a front wheel and a rear wheel of a vehicle, and an upper part is mounted on a mounting panel of a vehicle body through an insulator.

Such a shock absorber effectively offsets vibration generated between the front and rear wheels and the road surface through a spring when driving the vehicle, and simultaneously disperses the remaining load into the vehicle body and absorbs it.

Such a shock absorber secures stiffness of the mounting portion sufficiently before connecting to a vehicle body, and for reinforcing the mounting portion of the shock absorber, the conventional structure of the shock absorber housing is as follows.

FIG. 1 is a perspective view illustrating a reinforcing structure of a shock absorber housing according to the conventional art.

Referring to FIG. 1, the conventional shock absorber housing 100 is connected by welding between a shock absorber mounting panel 115 and a front side member 121, and the shock absorber mounting panel 115 is connected to a fender apron support member 117.

A front fender apron inner panel 111 is connected between the fender apron support member 117 and the front side member 121 in front of the shock absorber housing 100 and forms a wheel house with the shock absorber housing 100.

Further, the shock housing 100 is reinforced in stiffness by an extension panel 113 that is connected between the front side member 121 and the shock absorber mounting panel 115.

Here, the shock absorber mounting panel 115 forms a shock absorber mounting portion 200 by being connected to one side of the fender apron support member 117, and the shock absorber mounting portion 200 supports an impact load and a torsion load delivered from the road surface through the shock absorber.

In addition, the front side member 121 forms a sub-frame mounting portion 300 for connecting to a sub-frame 123 in the lower portion. The sub-frame mounting portion 300 is an input point of the load that is delivered from the road surface and that requires durability and stiffness.

However, as for the reinforcing structure of the conventional shock absorber housing as described above, even though the extension panel 113 is a reinforcing member for reinforcing the rigidity, acceleration noise and road transfer noise increase. These noises are delivered to a vehicle body by failing to absorb after effectively dispersing the vibration delivered from the road surface through the input point on driving due to lack of connectivity between the shock absorber mounting portion 200 and the sub frame mounting portion 300.

Accordingly, ride and handling performance and noise, vibration, harshness (NVH) performance of a vehicle are deteriorated, and general marketability of a vehicle is deteriorated.

The above information disclosed in this Background section is only for enhancement of understanding of the background of the invention, and therefore, it may contain information that does not form the prior art that is already known in this country to a person of ordinary skill in the art.

SUMMARY

An aspect of the present inventive concept provides a reinforcing structure of a shock absorber housing capable of improving ride and handling performance and noise, vibration, harshness (NVH) performance of a vehicle and increasing forming efficiency by decreasing the number of components as well as improving rigidity of an input point by having an improved structure of an extension.

Another aspect of the present inventive concept provides a reinforcing structure of a shock absorber capable of decreasing the number of parts.

According to an exemplary embodiment of the present inventive concept, a reinforcing structure of shock absorber housing includes a shock absorber housing connecting a shock absorber mounting panel and a front side member. A front fender apron inner panel connects the shock absorber mounting panel and the front side member. The front fender apron inner panel is coupled to an outer surface of the shock absorber housing and overlapped with a portion of the shock absorber housing to form a wheel house with the shock absorber housing. An extension panel is connected from a side of the overlapped portion of the shock absorber housing and the front fender apron inner panel to a sub-frame mounting portion of the front side member.

The shock absorber housing and the front fender apron inner panel may have a plurality of closed sectional surfaces formed by a plurality of forming portions, which outwardly protrude from each of the shock absorber housing and the front fender apron inner panel, at the overlapped portion.

The forming portion may protrude in a height direction from the shock absorber housing and the front fender apron inner panel.

The plurality of closed sectional surfaces may have a polygon shape having more than four angles.

The plurality of forming portions may extend to both inner sides of the shock absorber mounting panel and to the front side member.

The shock absorber housing and the front fender apron inner panel may be coupled by spot welding along an edge of the plurality of forming portions.

The extension panel may include an upper coupling part coupled to the plurality of forming portions and covering the plurality of forming portions of the front fender apron panel. A lower coupling part is coupled to an outer surface of the front side member and the sub-frame mounting portion.

The extension panel may be coupled to an outer surface of the front fender apron inner panel and the front side member along an edge of the extension panel.

In the exemplary embodiment of the present inventive concept, a forming portion is formed on each of the shock absorber housing and the fender apron inner panel in a height (up-and-down) direction and has a closed sectional surface, thus reinforcing rigidity without any additional parts.

In addition, on an outer side of the fender apron inner panel is coupled to the extension panel at a position corresponding to the closed sectional surface mentioned above and the closed sectional surface and the sub-frame mounting portion of the front side member are connected, thus increasing rigidity of an input point, increasing forming efficiency by decreasing the components, and reducing weight and cost.

As for any effects gained or expected from exemplary embodiments of the present inventive concept, it will be disclosed directly or implicitly in detailed descriptions of the exemplary embodiments of the present inventive concept. That is, with regard to various effects expected from the exemplary embodiments of the present inventive concept, it will be disclosed within the detailed descriptions. That is, various effects which are anticipated by an exemplary embodiment of the present inventive concept will be described in the detailed description below.

DETAILED DESCRIPTION OF THE EMBODIMENTS

Figure 1:
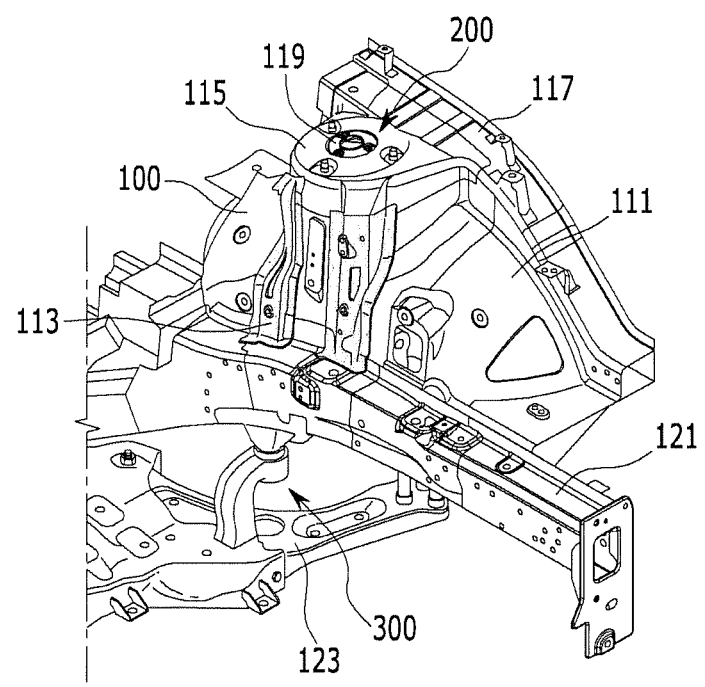
FIG. 1 is a perspective view illustrating a reinforcing structure of shock absorber housing according to the conventional art.

Herein, exemplary embodiments of the present inventive concept will be described by reference to the accompanying drawings.

In the drawings, in order to clearly describe the present disclosure, parts not in relation to the description are omitted.

Figure 2:
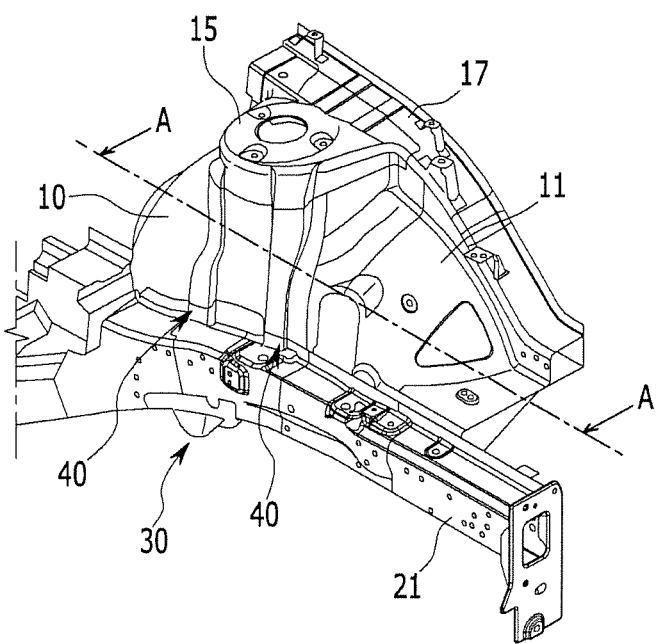
FIG. 2 is a perspective view of a shock absorber housing components to which a reinforcing structure of shock absorber housing is applied according to an exemplary embodiment of the present inventive concept.
Figure 3:
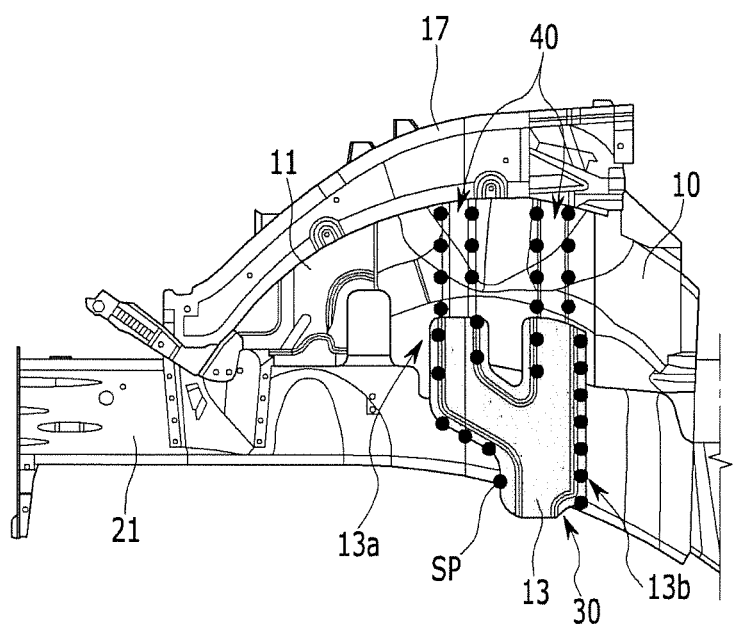
FIG. 3 is a perspective view of a welding portion of the reinforcing structure of shock absorber housing according to an exemplary embodiment of the present inventive concept.

FIG. 2 is a perspective view of shock absorber housing components to which a reinforcing structure of shock absorber housing is applied according to an exemplary embodiment of the present inventive concept, and FIG. 3 is a perspective view of a welding portion of the reinforcing structure of shock absorber housing according to an exemplary embodiment of the present inventive concept.

A reinforcing structure of a shock absorber housing for a vehicle according to the present disclosure improves ride and handling performance and noise, vibration, harshness (NVH) performance of a vehicle by increasing the degree of freedom while decreasing the number of components. The reinforcing structure further improves rigidity of the vehicle by strengthening the structure of an extension and by improving rigidity of an input point.

Referring to FIGS. 2 to 3, a shock absorber housing 10 is formed between a fender apron support member 17 that is installed in a length direction of a vehicle body while forming a framework of the wheel house in the side of a vehicle and a front side member 21 of a beam-shaped that is located in the lower part of the side of a vehicle.

For reinforcing such a shock absorber housing 10, the reinforcing structure of the shock absorber housing according to the present disclosure includes a front fender apron inner panel 11 and an extension panel 13.

First of all, the shock absorber housing 10 is coupled by welding between a shock absorber mounting panel 15 and a front side member 21.

Herein, the shock absorber mounting panel 15 is coupled to a side of the fender apron support member 17, and fixes onto the vehicle body by connecting the shock absorber that realizes smooth driving performance by attenuating the elastic force of a spring that absorbs impact from a road surface driving through an insulator.

The shock absorber housing 10 according to the present disclosure includes two forming portions 40 protruding on an outer side of a vehicle body and formed in a height (up-and-down) direction.

In the present disclosure, two forming portions 40 are described as an exemplary embodiment, but it is not always limited thereof, and if required, the number of forming portion 40 may change.

The front fender apron inner panel 11 is coupled between the fender apron support member 17 and the front side member 21 in front of the shock absorber housing 10, and forms a wheel house together with the shock absorber housing 10.

Further, the front fender apron inner panel 11 is formed in an identical shape to the shock absorber housing 10 so that a partial section thereof is overlapped with the shock absorber housing 10.

In addition, the front fender apron inner panel 11, same as the shock absorber housing 10, forms two forming portions 40 in a height (up-and-down) direction.

In the present disclosure, two forming portions 40 are described as an example, it is not always limited thereof, but the number of forming portion 40 of the front fender apron inner panel 11 may depend on that of the shock absorber housing 10.

Here, the front fender apron inner panel 11 is coupled each other by spot welding (SP) along an edge of each forming portion 40 that overlapped with the shock absorber housing 10.

Figure 4:
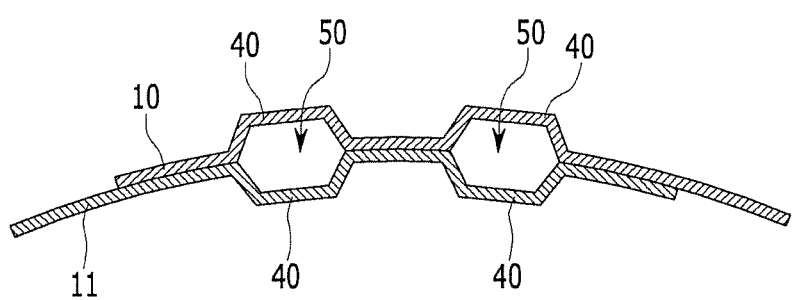
FIG. 4 is cross-sectional view cut along the A-A line of FIG. 2.

Referring to FIG. 4, each of the forming portions 40 is connected to the front side member 21, which corresponds to both ends protruding inside of the shock absorber mounting panel 15.

In addition, each of the forming portions 40 is formed on an inner side that a partial section of the shock absorber housing 10 and the front fender apron inner panel 11 are overlapped to form a closed sectional surface 50.

In the present disclosure, an example is described that two closed sectional surfaces 50 are formed by each of two forming portions 40, but it is available to form more forming portions 40 as needed, and accordingly the number of the closed sectional surface 50 may increase.

Herein, the closed sectional surface 50 may have polygons more than quadrangle.

Here, the closed sectional surface 50 according to the present disclosure is described with a hexagonal shape as an example, which is formed by the shock absorber housing 10 and the front fender apron inner panel 20, but it is not always limited thereto, and a shape of the closed sectional surface 50 may be vary depending on the forming portions 40.

As such, the closed sectional surface 50 formed by the forming portions 40 described above reinforces rigidity of the vehicle without any additional reinforcing components.

The extension panel 13 includes an upper coupling part 13a and a lower coupling part 13b.

The upper coupling part 13a is coupled at a position that corresponds to the forming portions 40. The lower coupling part 13b extends to a lower portion of the upper coupling part 13a and coupled to connect an outer surface of the front side member 21 and the sub-frame mounting portion 30.

That is, the extension panel 13 that is formed of the upper coupling part 13a and the lower coupling part 13b is coupled to the front fender apron inner panel 11 and the front side member 21 on a side of a wheel house.

Herein, the coupling is made with the front side member 21 by spot welding (SP) along the edge of the lower coupling part 13b of the extension panel 13.

The extension panel 13 is coupled to extend onto the sub-frame mounting portion 30 of the front side member 21.

The extension panel 13 has a "Y" letter shape, but not limited thereto, and any shape is available if it has the effect of an exemplary embodiment of the present inventive concept.

Accordingly, the extension panel 13 is extendedly coupled to the sub-frame mounting portion 30 and coupled to the forming portions 40 which are connected to the shock absorber mounting panel 15 to provide the connectivity, and enables the vibration inputted when driving a vehicle to be stably dispersed.

In addition, by integrating a plurality of extension panels 13 conventionally applied into one component, the effect as much as the conventional art can be obtained, and according to this, the number of constituent component is decrease, thereby reducing weight and cost as well.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A structure for reinforcing a shock absorber housing of a vehicle, comprising:

a shock absorber housing connecting a shock absorber mounting panel and a front side member;

a front fender apron inner panel connecting the shock absorber mounting panel and the front side member, the front fender apron inner panel coupled to an outer surface of the shock absorber housing and overlapped with a portion of the shock absorber housing to form a wheel house with the shock absorber housing; and an extension panel connected from a side of the overlapped portion of the shock absorber housing and the front fender apron inner panel to a sub-frame mounting portion of the front side member, wherein the shock absorber housing and the front fender apron inner panel have a plurality of closed sectional surfaces formed by a plurality of forming portions, which outwardly protrude from each of the shock absorber housing and the front fender apron inner panel, at the overlapped portion, and wherein the plurality of forming portions extend to both inner sides of the shock absorber mounting panel and to the front side member.

2. The structure of claim 1, wherein the plurality of forming portions protrude in a height direction from the shock absorber housing and the front fender apron inner panel.

3. The structure of claim 1, wherein each of the plurality of closed sectional surfaces has a polygon shape having more than four angles.

4. The structure of claim 1, wherein the shock absorber housing and the front fender apron inner panel are coupled by spot welding along an edge of the plurality of forming portions.

5. The structure of claim 1, wherein the extension panel includes: an upper coupling part coupled to the plurality of forming portions and covering the plurality of forming portions of the front fender apron panel; and a lower coupling part coupled to an outer surface of the front side member and the sub-frame mounting portion.

6. The structure of claim 1, wherein the extension panel is coupled to an outer surface of the front fender apron inner panel and the front side member along an edge of the extension panel.

7. The structure of claim 1, wherein the extension panel has a Y-shape.

* * * * *